United States Patent [19]

Wieland et al.

[11] Patent Number: 4,503,683

[45] Date of Patent: Mar. 12, 1985

[54] COMPACT COOLING TURBINE-HEAT EXCHANGER ASSEMBLY

[75] Inventors: Kurt H. Wieland, Rolling Hills Estates; Donald M. Spencer, Van Nuys; Robert C. Kinsell, Los Angeles, all of Calif.

[73] Assignee: The Garrett Corporation, Los Angeles, Calif.

[21] Appl. No.: 562,490

[22] Filed: Dec. 16, 1983

[51] Int. Cl.³ .................................................. F25B 9/00
[52] U.S. Cl. .......................................... 62/86; 62/402
[58] Field of Search ................ 62/86, 87, 88, 172, 62/401, 402

[56] References Cited

U.S. PATENT DOCUMENTS

| | | | |
|---|---|---|---|
| 1,310,672 | 8/1919 | Sherbondy | 62/402 |
| 2,046,314 | 7/1936 | Benkly | 62/402 |
| 2,223,847 | 12/1940 | Engdahl | 308/17 |
| 2,269,181 | 1/1942 | Clarke | 230/116 |
| 2,502,194 | 3/1950 | Wood | 62/402 |
| 2,518,246 | 8/1950 | Morris | 62/402 |
| 2,585,570 | 2/1952 | Messinger et al. | 62/402 |
| 2,646,210 | 7/1953 | Kohlmann et al. | 230/116 |
| 2,721,456 | 10/1955 | Whitney, Jr. et al. | 62/402 |
| 2,767,561 | 10/1956 | Seeger | 62/402 |
| 2,884,846 | 5/1959 | Goodman et al. | 62/402 |
| 2,916,890 | 12/1959 | Stein | 62/402 |
| 2,933,044 | 4/1960 | Williams | 103/87 |
| 2,977,051 | 3/1961 | Farkas et al. | 62/402 |
| 3,251,540 | 5/1966 | Kinsworthy | 230/117 |
| 3,728,857 | 4/1973 | Nichols | 62/402 |

FOREIGN PATENT DOCUMENTS 553411  4/1977  U.S.S.R. .................. 42/402

*Primary Examiner*—Ronald C. Capossela
*Attorney, Agent, or Firm*—J. Richard Konneker; Albert J. Miller

[57] ABSTRACT

A compact air cycle refrigeration system utilizes a three wheel air cycle cooling machine having a fan mounted between a turbine and compressor on a common drive shaft. The fan is positioned between two series-mounted heat exchangers mounted in a ram air duct and used to cool hot engine bleed air which drives the turbine.

10 Claims, 5 Drawing Figures

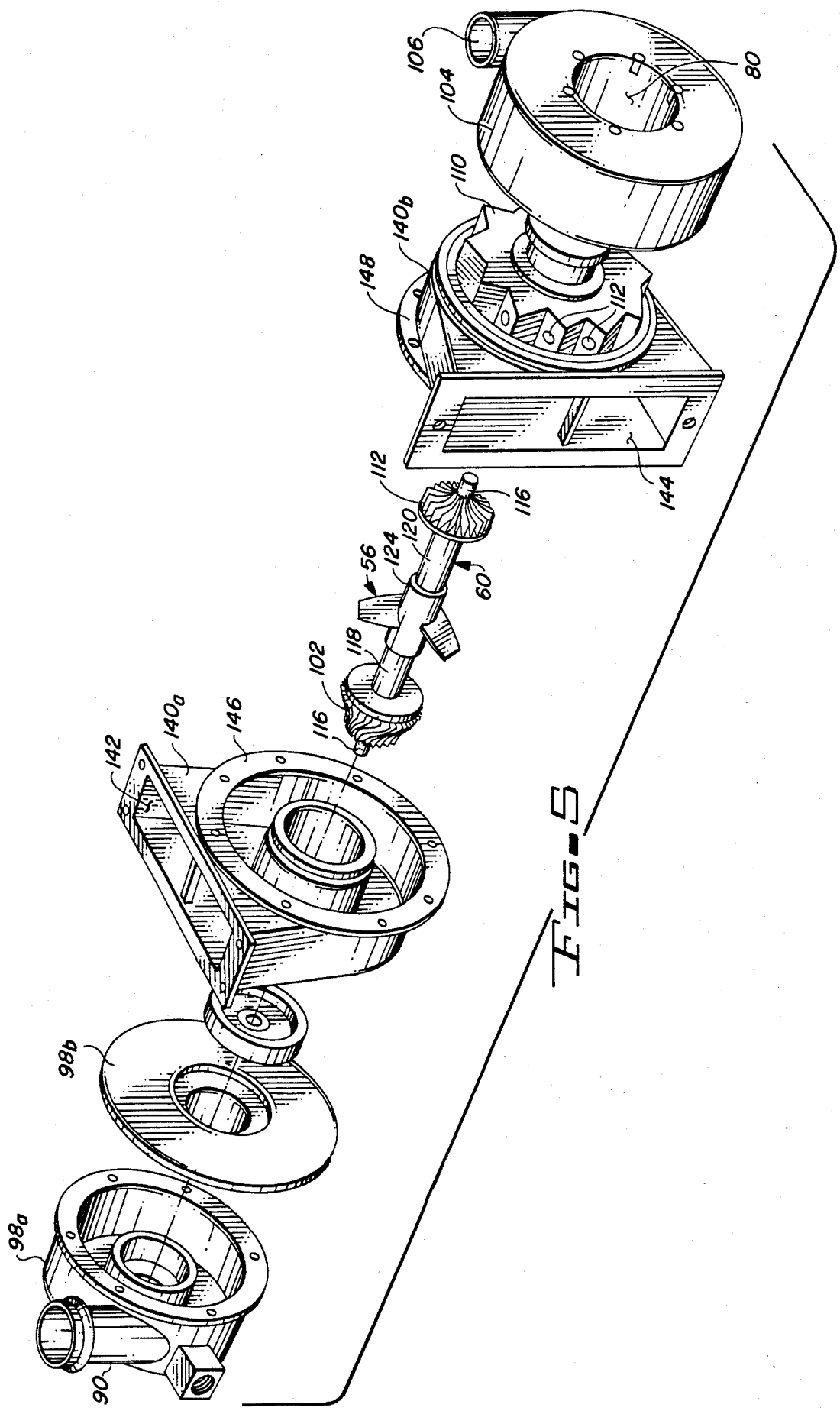

COMPACT COOLING TURBINE-HEAT EXCHANGER ASSEMBLY

CROSS-REFERENCE TO RELATED APPLICATION

This application discloses subject matter common to that disclosed in the copending patent application Ser. No. 562,488 entitled "Three Wheel Center Fan Cooling Turbine Apparatus and Associated Methods" filed concurently herewith.

BACKGROUND OF THE INVENTION

The present invention relates generally to turbine-driven air cycle refrigeration systems used to provide pressurized cooling air to aircraft cabine or the like. More specifically, the invention provides a uniquely constructed three wheel cooling turbine in which the fan element is positioned between the compressor and turbine elements on a common drive shaft, and in which the pressurized air which drives the turbine is also used to lubricate the shaft's journal and thrust bearings.

Conventional cooling turbines (also known as "air cycle cooling machines") used to supply pressurized cooling air to aircraft cabins comprises three primary elements—a fan impeller, a turbine wheel and a compressor impeller—each fixedly mounted on a common drive shaft. The fan impeller is mounted at one end of the shaft, while the compressor and turbine elements are mounted on the opposite shaft end. Rotational support for the shaft is typically effected through the use of conventional oil-lubricated bearings supplied from a conventional lubricant reservoir supply system. These bearings are positioned outside of the ram air duct to isolate them from the very high temperature heated ram air being drawn across the fan. Because of this, the fan is mounted in a cantilevered fashion upon the portion of the drive shaft projecting into the duct.

During operation of the machine, compressor bleed air from the aircraft's engine is forced through a first heat exchanger positioned in a ram air duct and then into the inlet of the air cycle machine compressor. The compressed bleed air discharged from the machine's compressor is flowed through a second heat exchanger in the ram air duct (in series with the first heat exchanger), through a conventional dehumidifying system, and then into and through the turbine, thereby rotationally driving the turbine and, via the common drive shaft, the compressor and fan. Finally, the expanded and cooled air discharged from the turbine is flowed into the aircraft cabin as environmental control cooling air.

The fan impeller and a portion of the driveshaft are positioned within the ram air duct downstream from the first and second heat exchangers, while the compressor and turbine sections, and the remainder of the shaft, project outwardly of the duct. As the fan is rotationally driven by the turbine it draws ambient air into the inlet end of the ram air duct, across the heat exchangers and the fan itself, and then discharges the air outwardly through the outlet end of the duct. In this manner the turbine-driven fan provides both an additional load for the turbine and a continuous ambient air flow across the heat exchangers to cool the two bleed air streams being flowed therethrough.

Although generally reliable and fairly simple, the conventional air cycle cooling machine system just described has associated therewith several well-known disadvantages and heretofore unsolved problems. One such problem is that because the fan impeller is "outboard" mounted (i.e., cantilevered at one end of the drive shaft a considerable distance from the compressor and turbine and their housings near the other end of the shaft) its maximum permissible rotational speed dictates the design parameters of the turbine and compressor, thereby artificially limiting their efficiencies.

More specifically, since there is a critical rotational speed above which the cantilevered fan cannot be operated, such critical speed also sets the maximum rotational speed of both the compressor and fan. Thus, for given bleed air flow rates through the compressor and turbine, the sizes and configurations of these elements must be designed so that their rotational speeds do not exceed the maximum permissible fan speed. This typically means that both the compressor and turbine must be operated with considerably less efficiency than would otherwise be possible.

Another problem is that the fan must usually be of a special lightweight material, such as titanium, to withstand the high temperature (typically in excess of 450° F.) downstream from the dual heat exchangers, and to lessen the rotationally-induced bending stress on the shaft (thereby permitting a higher maximum fan speed). The necessity of using a titanium fan impeller, of course, markedly increases the cost of the air cycle machine.

Finally, in conventional air cycle machines it is necessary to isolate their oil-fed bearings from the high temperature air exiting the ram air duct heat exchangers. As previously described, this requires that all of the air cycle machine except the fan and its cantilevered shaft portion be positioned outside of the ram air duct—an orientation which typically results in the air cycle machine projecting laterally a considerable distance from one side of the duct, thereby adding appreciably to the overall equipment space requirements.

Accordingly, it is an object of the present invention to provide an air cycle cooling machine which reduces or eliminates above-mentioned problems and disadvantages associated with conventional air cycle cooling apparatus.

SUMMARY OF THE INVENTION

In carrying out principles of the present invention, an air cycle cooling machine is provided which comprises compressor means, turbine means and fan means secured in a mutually spaced relationship along common driveshaft means and positioned within separate, contiguous housings. Importantly, the fan means are positioned between the compressor and turbine means which are respectively positioned at opposite ends of the driveshaft means.

Axial thrust and rotational support for the shaft are provided by conventional gas foil bearings carried within the contiguous housings. During operation of the air cycle machine, these foil bearings are lubricated by pressurized compressor bleed air which is used to drive the turbine means. More specifically, compressor bleed air exiting the second ram air duct heat exchanger is forced into the turbine housing and across the turbine. A portion of this entering air is sequentially forced through the foil space of the various foil bearings (thereby continuously lubricating them), into the fan housing, and out the fan housing discharge opening.

The air cycle cooling machine is uniquely incorporated into a particularly compact cooling turbine-heat exchanger assembly in which the machine's fan section is operatively positioned between the two series-mounted heat exchangers in the ram air duct.

BRIEF DESCRIPTION OF THE DRAWINGS

FIG. 5 is a reduced scale, exploded perspective view of the cooling machine of FIG. 3.

DETAILED DESCRIPTION

Figure 1:
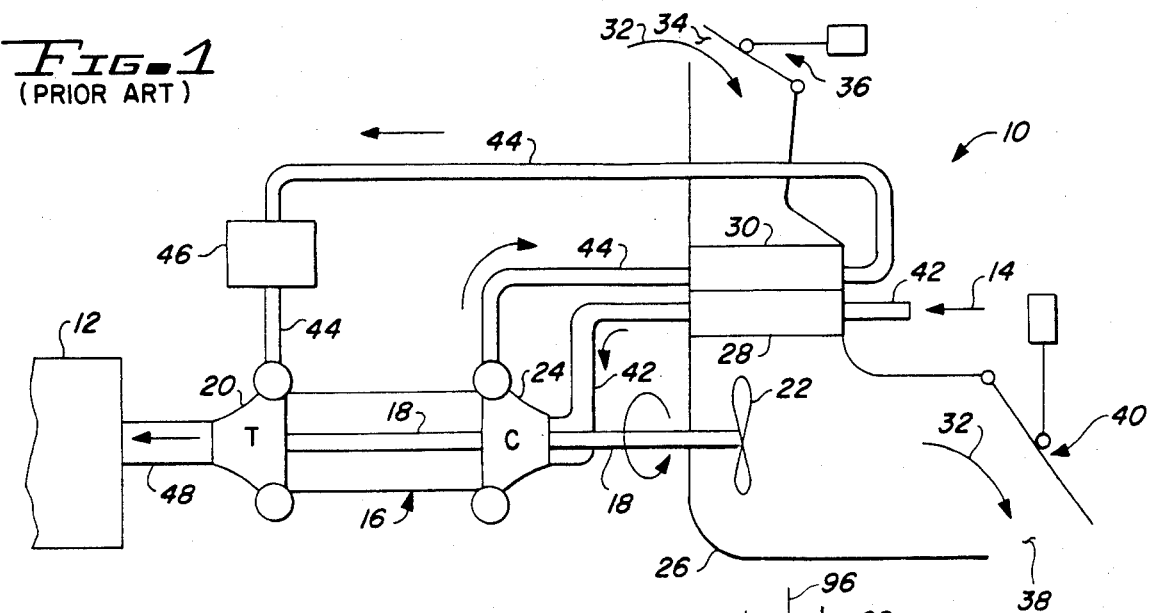
FIG. 1 (Prior Art) is a schematic diagram of a conventional air cycle cooling machine system.

Schematically illustrated in FIG. 1 is a conventional air cycle cooling machine system 10 which is used to supply environmental control cooling air to an aircraft cabin 12 utilizing bleed air 14 from the aircraft's propulsion engine compressor. System 10 includes an air cycle cooling machine 16 that comprises a drive shaft 18, a turbine 20 secured to the left end of the shaft, a fan 22 mounted on the right end of the shaft, and a compressor 24 operably mounted on a central portion of the shaft between the turbine and the fan.

Fan 22 is "outboard" mounted (i.e. cantilevered on shaft 18) relative to the turbine 20 and compressor 24 and is positioned within a ram air duct 26 downstream from a pair of series-mounted heat exchangers 28, 30 positioned within the duct. Operation of the fan 22 draws ambient air 32 into an inlet opening 34 of duct 26 controlled by conventional valve and damper means 36, across the heat exchangers 28,30, and forces the air 32 out a discharge opening 38 positioned at the opposite end of the duct and controlled by conventional valve and damper means 49.

During operation of the cooling machine 16, hot compressor bleed air 14 is forced, via a supply duct 42, sequentially through heat exchanger 28 and into the inlet of compressor 24. This air, partially cooled by heat exchanger 28, is then discharged at a higher pressure from compressor 24 and forced, via a discharge duct 44, sequentially through heat exchanger 30 (where the air is further cooled), a conventional moisture removal system 46, and through the turbine 20. The bleed air flowed through turbine 20 is expanded and further cooled, exiting the turbine as environmental control cooling air supplied to cabin 12 via a discharge duct 48. Such air also rotationally drives the turbine 20 and, via the common driveshaft 18, the fan 22 and compressor 24.

Several well-known problems and disadvantages are associated with the conventional air cycle cooling machine 16. For example, because the temperature of the ram air exiting heat exchanger 28 is commonly in excess of 450° F., it is necessary to isolate the bearings (typically of a conventional oil-lubricated type) which rotationally support shaft 18 between the turbine and compressor from such high temperature. This requirement dictates that fan 22 be "outboard" mounted as illustrated so that the balance of the cooling machine 16 can be positioned entirely outside of the duct 26. As can be seen, this results in a rather awkward, space-consuming cooling system package which has a total width (the left-to-right dimension in FIG. 1) equal to the width of duct 26 plus nearly the entire length of cooling machine 16.

Additionally, because of the required cantilevered positioning of fan 22 relative to the turbine 20 and compressor 24, several other design and operating problems arise. First, it is necessary to extend the shaft 18 through both the supply duct 42 (adjacent the compressor inlet) and a sidewall of the ram air duct 26, requiring that each shaft-duct juncture be carefully sealed to avoid leakage. Moreover, the shaft 18 must extend entirely through the compressor 24, thereby unavoidably blocking a portion of its inlet opening.

The conventional cantilevered positioning of fan 22 also imposes artificial design limitations on the turbine 20 and compressor 24. Specifically, to limit bending stress on the portion of shaft 18 extending between the compressor and fan, the rotational speed of fan 22 must be kept below a critical limit—thereby limiting the rotational speed of both the turbine and compressor. This requires that the turbine and compressor be configured such that at their design flow rates neither of their rotational speeds exceeds the critical fan seed. The result is that the efficiency of these elements (and thus the overall efficiency of the cooling machine) is markedly less than might otherwise be possible.

Finally, since the fan 22 is exposed to the high temperature ram air (usually at least 400° F.) exiting heat exchanger 28 within duct 26, it is normally required that it be constructed of a highly heat resistant material such as titanium. This, of course, increases the cost of the air cycle machine 16. Additionally, titanium being a relatively heavy material, the rotational speed limit of fan 22 (and thus the compressor and turbine as well) is further reduced.

The present invention provides a greatly improved, compact air cycle cooling machine system 50 (FIGS. 2 & 4) which eliminates or minimizes the above-mentioned and other problems. System 50 incorporates a uniquely constructed cooling machine 52 which, like its conventional counterpart 16, comprises turbine means 54, fan means 56, and compressor means 58—each secured to a common shaft means 60 for conjoint rotation therewith.

Importantly, however, the fan means 56 are positioned between the turbine means 54 and the compressor means 58 which are respectively secured to the opposite ends of shaft means 60. Circumscribing the fan means 56 and extending between the turbine means 54 and compressor means 58 is a fan housing 62 having an inlet 64 positioned between the fan and turbine. Secured to inlet 64 is a first portion 68 of a ram air duct having positioned therein a heat exchanger 70. A second portion 72 of the ram air duct is secured to housing outlet 66 and has positioned therein a heat exchanger 74.

During operation of system 50, hot compressor bleed air 76 is forced, via a supply duct 78, through heat exchanger 74 and into the inlet 80 of the compressor 58. The compressed bleed air discharged from the compressor 58 is then flowed, via discharge ductwork 82, sequentially through heat exchanger 70, a conventional moisture removal system 84, and into the inlet 86 of turbine 54. Expanded, cooled air 88 exiting the outlet 90 is supplied, via a discharge duct 92, as environmental control cooling air to an aircraft cabin 94 or other air conditioned space. Additionally, passage of the bleed air through the turbine rotationally drives the three components of the air cycle machine 52—turbine 54, fan 56 and compressor 58. Rotation of fan 56 draws ambient air 96 into ram air duct portion 68, sequentially across heat exchanger 70, through the fan housing 62 and across heat exchanger 74, and then forces the ambient air outwardly through duct portion 72, thereby precooling the bleed air flowing through ducts 78 and 82.

Figure 3:
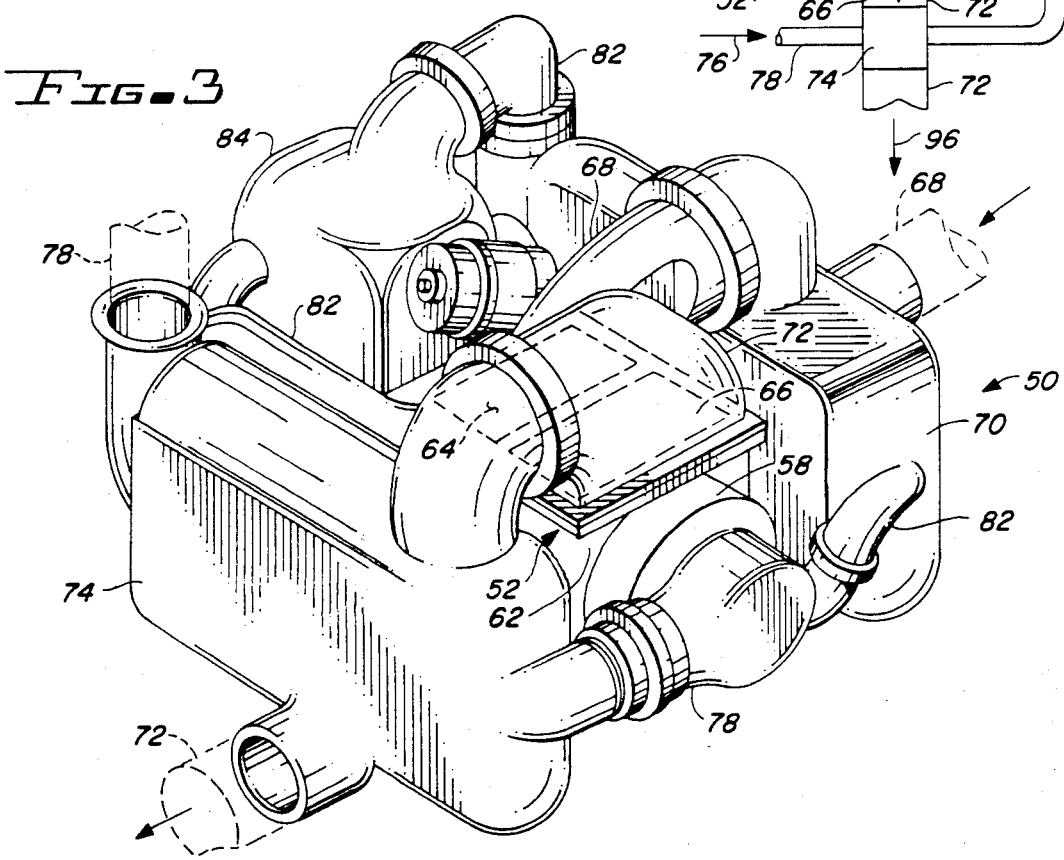
FIG. 3 is a perspective view of the system of FIG. 2.

The unique central positioning of fan 56 facilitates an extremely compact packaging arrangement of system 50 as perspectively illustrated in FIG. 3. In such arrangement, both the air cycle machine 52 and the moisture removal system 84 are positioned between the heat exchangers 70, 74, with machine 52 extending longitudinally parallel to the lengths of the heat exchangers, and the moisture removal system 84 being positioned adjacent the turbine end of the cooling machine. Positioned in this fashion, the air cycle machine does not project outwardly of the heat exchangers, thereby greatly reducing the overall size of system 50 relative to the size of the conventional system 10.

Figure 2:
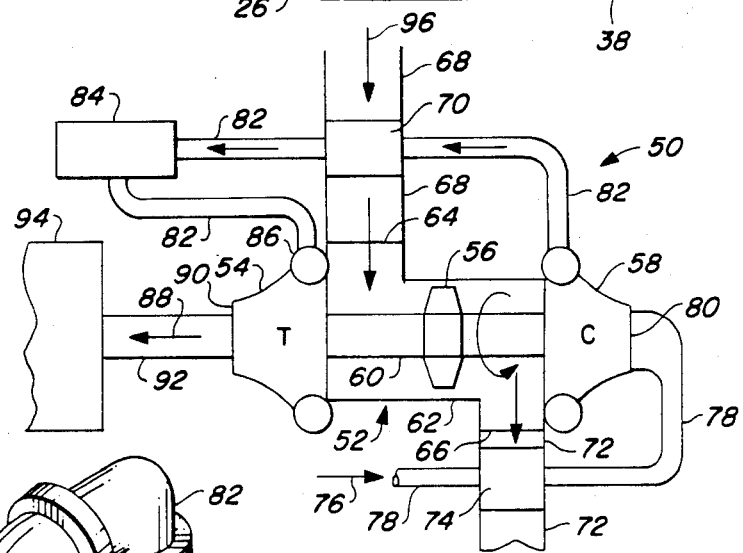
FIG. 2 is a schematic diagram of an improved system incorporating a center fan air cycle cooling machine which embodies principles of the present invention.

It should also be noted that in the system arrangement depicted in FIGS. 2 and 3 the fan 56 is positioned between the two exchangers 70, 74 instead of being positioned downstream of both heat exchangers as in the conventional system of FIG. 1. Unlike the conventional fan positioned in FIG. 1, this novel arrangement protects the fan 56 from debris in the ram air duct (either upstream or downstream from the fan) by using the heat exchangers 70, 72 as upstream and downstream debris barriers, respectively.

Not only is the fan 56 essentially completely protected and isolated from potentially harmful debris, but it need withstand only approximately half the temperature that its conventional counterpart must withstand. This is due to the fact that fan 56 is downstream of only one of the heat exchangers 70, 72. Accordingly, of the total heat added to the ambient air 96 by such heat exchangers approximatly half is added after the air has exited the fan housing 62. Because of this feature, fan 56 is able to be constructed of aluminum rather than the heavier and costlier titanium required for fan 22.

Figure 4:
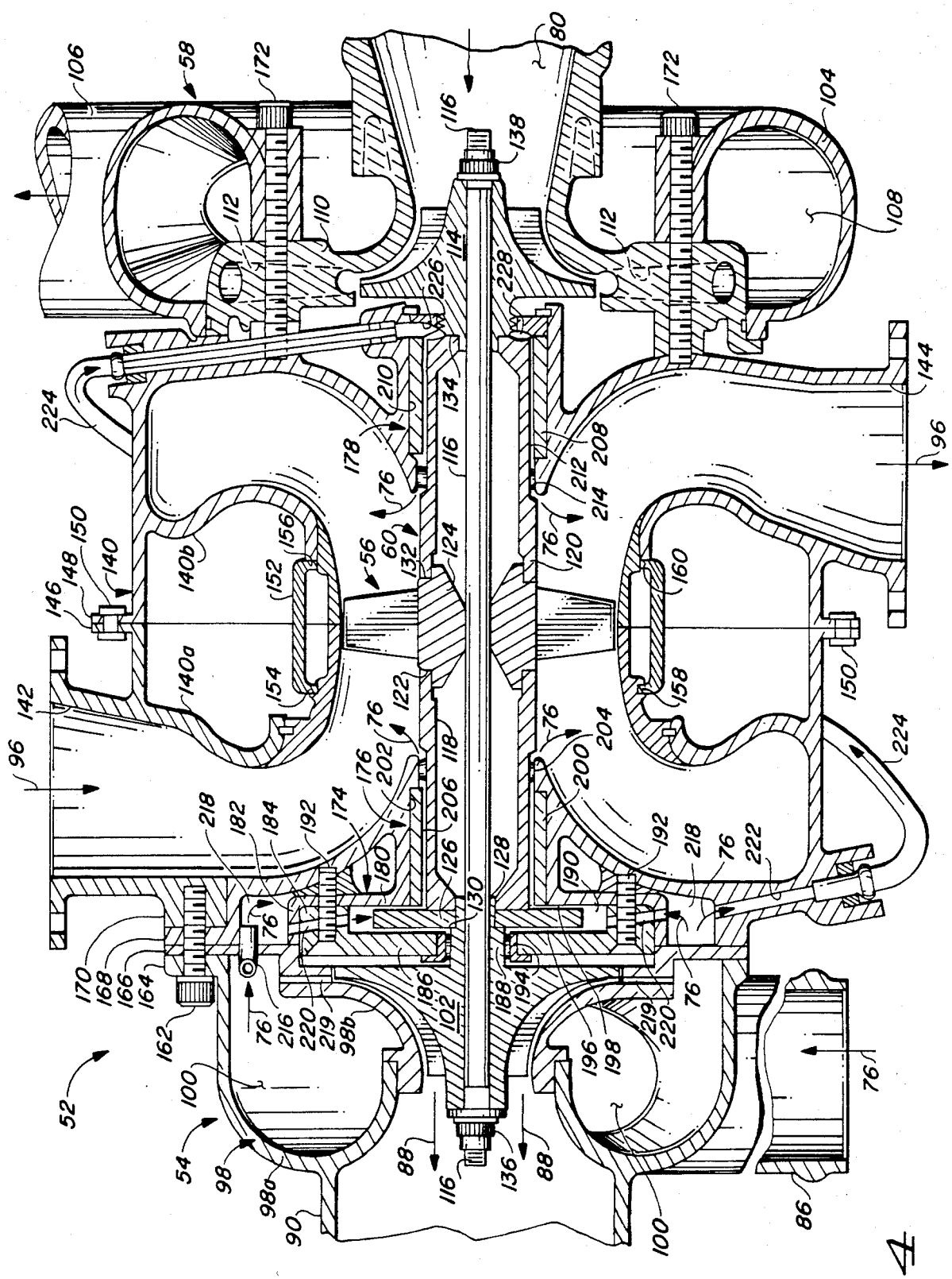
FIG. 4 is a greatly enlarged cross-sectional view through the cooling machine schematically illustrated in FIG. 2.

Referring to FIGS. 4 and 5, the construction and operation of the improved air cycle cooling machine 52 will now be described in greater detail. The turbine means 54 include a hollow, generally cylindrical housing 98 into which the turbine inlet portion 86 enters generally tangentially, and from which the turbine outlet portion 90 centrally extends in an axial direction. Housing 98 comprises axially outer and inner portions 98a, 98b and has defined therein a generally annular inlet passage 100 which circumscribes a bladed turbine wheel 102 and communicates with the turbine inlet 86. The compressor means 58 comprise a hollow, generally cylindrical housing 104 into which the inlet 80 axially enters and from which an outlet 106 generally tangentially extends. Housing 104 has defined therein an annular discharge passage 108 which circumscribes an annular diffuser section 110 having formed therein an annular array of generally radially extending diffuser passages 112. Passages 112 extend between the inlet and discharge passages 80, 108 and circumscribe the discharge end of a bladed compressor impeller 114.

Shaft means 60, which extend between the mutually spaced turbine wheel 102 and compressor impeller 114, include a main or inner shaft 116 which extends, along a central portion thereof, through the fan impeller 56. At its left end shaft 116 is extended through turbine wheel 102, and at its right end is extended through the compressor impeller 114. The shaft means also include a first hollow outer shaft portion 118 and a second hollow outer shaft portion 120. Shaft portion 118 coaxially circumscribes the inner shaft 116 and extends from an annular shoulder 122 formed on a central hub portion 124 of fan 56 rightwardly to a radially inner portion of an annular bearing runner plate 126 (having a function subsequently described). Plate 126, as well as a left end portion of outer shaft portion 118, has extended therethrough an axially inner end portion 128 of turbine wheel 102, the plate 126 bearing against an annular shoulder 130 formed on impeller 102. Outer shaft portion 120 extends between an annular shoulder 132 on the fan hub 124 and an annular shoulder 134 on the compressor impeller 114.

The turbine wheel 102, bearing plate 126, outer shaft portions 118, 120, fan hub 124 and compressor 114 are frictionally locked together for conjoint rotation by means of a pair of tightening nuts 136, 138 which threadingly engage the outer ends of the inner shaft 116 and respectively bear against the outer ends of the turbine wheel 102 and the compressor impeller 114. As these nuts are tightened, the turbine wheel 102 and compressor impeller 114 are forced inwardly along shaft 116, in turn forcing the outer shaft portions 118, 120 into frictional engagement with fan hub 124. In this manner the shaft means 60 are frictionally locked to the turbine, fan and compressor elements of the air cycle machine 52.

Extending completely between the turbine housing 98 and the compressor housing 104, and circumscribing the fan 56, is a hollow fan housing 140 which is axially divided into two separate, generally cylindrical sections 140a, 140b. Section 140a has an inlet 142 on one side of the fan 56 and section 140b has an outlet 144 on the other side of the fan. The two housing sections are joined at their juncture by means of a pair of abutting annular flanges 146, 148 thereon through which extends an annular array of bolts 150 or other suitable fasteners. Circumscribing a radially inner portion of the abutting housing sections 104a, 104b, and the fan 156, is a burst containment ring 152 having a generally U-shaped cross-section with inturned lips 154, 156. To restrain ring 152 against axial movement, lip 154 is received in an annular challel 158 formed in housing section 140a, and lip 156 bears against an annular shoulder 160 formed in housing section 140b.

The fan housing section 140a is secured to the turbine housing 98 by an annular array of bolts 162 (only one of which is shown in FIG. 4) which extends successively through annular flanges 168, 170 the turbine housing 98, and annular flanges 168, 170 on fan housing section 140a. At the opposite end of the air cycle machine 52, the compressor housing 104 is secured to fan housing section 140b by an annular array of bolts 172 which extend successively through the compressor housing 104, the diffuser 110 and into the fan housing 140b.

This arrangement and joining method very advantageously permits the turbine inlet 86, fan inlet 142, fan outlet 144 and compressor outlet 106 to be "clocked" (i.e., rotationally oriented) relative to each other in a wide variety of manners, thereby affording great installation flexibility to the cooling machine 52. More specifically, as can be seen by comparing FIGS. 3, 4 and 5, since housings 98 and 104 can be variably rotationally oriented relative to their adjacent housing sections 140a, 140b, and sections 140a, 140b can be similarly adjusted, the aforementioned inlets and outlets can be independently positioned to provide convenient connection points for an equally wide variety of bleed air duct and ram air duct orientations. FIGS. 3, 4 and 5 each depict a different one of many possible inlet-outlet relative positioning combinations made possible by this facet of the present invention.

At this point another distinct advantage of the unique construction of the air cycle machine 52 should be noted. Unlike the conventional construction of the FIG. 1 cooling machine 16, the shaft means 60 of machine 52 do not extend entirely through the compressor inlet 80 (or, for that matter, the turbine outlet 90). Thus, such shaft means in no way impede the flow of air into the compressor 114. Neither do such shaft means have to be extended through any compressor inlet ductwork as in the FIG. 1 conventional configuration.

Additionally, it should be noted that the maximum diameter of the shaft means 60 (i.e. the outer diameter of shaft sections 118, 120) is essentially as large as the discharge diameter of turbine wheel 102 or the inlet diameter of compressor impeller 114. It is, of course, this large diameter shaft means portion which supports the fan 56 both at a central and radial outer position of its hub 124. This larger diameter shaft support of the fan could not be accomplished in the conventional FIG. 1 configuration because the portion of shaft 18 extending between compressor 24 and fan 22 must of necessity be smaller in diameter than the compressor impeller inlet diameter.

Facilitating the advantageous central positioning of the fan means 56 is the use in the present invention of a unique gas foil bearing system which supports the shaft means 60 and is continuously lubricated by a portion of the bleed air 76 used to rotationally drive the turbine 102, fan 56 and compress 114. Referring now to FIG. 4, the bearing system comprises a gas foil thrust bearing 174 positioned between the turbine wheel 102 and the left end of outer shaft section 118, a gas foil journal bearing 176 positioned at the left end of shaft section 118, and a gas foil journal bearing 178 positioned at the right end of outer shaft section 120. The gas foil bearings 174, 176 and 178 are each generally similar in construction to thos illustrated and described in U.S. Pat. No. 3,615,121 assigned to the present assignee. However, in the present invention such bearings are positioned and continuously lubricated in a novel manner which will now be described.

Foil bearing 174 comprises an annular inner thrust plate 180 which is defined by a radially inner left end portion of fan housing section 140a and circumscribes the left end of outer shaft section 118. Plate 180 has a leftwardly extending annular lip 182 which overlies a rightwardly extending annular lip 184 on an annular outer thrust plate 186 that circumscribes a narrow neck portion 188 of the turbine wheel immediately to the left of shoulder 130. Plate 186 is positioned to the left of plate 180, defining therewith an annular passage 190, and is secured around its periphery to the fan housing section 140a by an annular array of bolts 192. Operatively positioned between the turbine wheel nect 188 and the thrust plate 186 is an annular knife-edged labyrinth seal 194. The annular runner plate 126 extends in a radial direction partially into the annular passage 190. Plate 126 is slightly thinner than the thickness of passage 190, thereby defining with plates 180 and 186 an annular clearance space 196 between plates 186 and 126, and an annular clearance space 198 between plates 126 and 180. Operatively positioned in each of the clearance spaces 196, 198 is an annular array of overlapping foil elements (not shown) which function during operation of the gas foil thrust bearing 174 as described in the referenced U.S. Pat. No. 3,615,121.

Gas foil journal bearing 176 comprises a cylindrical bushing 200 which coaxially circumscribes a left end portion of the outer shaft section 118 and is press-fitted into a circular bore 202 formed in the fan housing section 140a. Interposed between housing section 140a and shaft section 118 immediately to the right of bushing 200 is an annular knife-edged labyrinth seal 204. The inner diameter of bushing 200 is slightly larger than the portion of shaft section 118 which it circumscribes, and defines therewith an annular clearance space 206 which communicates at its left end with a radially inner annular portion of clearance space 198. Operatively positioned within clearance space 206 is an annular array of overlapping foil elements (not shown) which function during rotation of the shaft means 60 as described in the referenced patent.

Gas foil journal bearing 178 is similar in construction and operation to bearing 176 and comprises a bushing 208 press-fitted into a circular bore 210 in fan housing section 140b, circumscribing a right end portion of outer shaft section 120 and defining therewith an annular clearance space 212 in which is operatively positioned an annular array of foil elements (not shown). Interposed between fan housing section 140b and shaft section 120 immediately to the left of bushing 208 is an annular knife-edged labyrinth seal 214.

The gas foil bearing system (i.e., bearings 174, 176 and 178) is lubricated, and provided with the necessary hydrodynamic supporting force, by the use of bleed air 76 in the following manner. A small portion of the pressurized bleed air 76 entering the turbine housing inlet passage 100 is forced, via a small transfer tube 216, into an annular passage 218 which is defined between the turbine housing and fan housing sections 98b, 140a and circumscribes the flange lip 182. The balance of the bleed air entering inlet passage 100 is forced radially inwardly through turbine nozzle openings 219 and through the bladed portion of turbine wheel 102, becoming the cooling air 88 upon its exit from the wheel. From passage 218 bleed air is forced, via an annular series of bores 220 formed through the abutting flange lips 182, 184, into a radially outer portion of the annular passage 190. Bleed air entering passage 190 is sequentially forced through thrust bearing clearance spaces 196, 198, through the journal bearing clearance space 206, across the labyrinth seal 204, and into the interior of fan housing section 140a.

Another portion of the bleed air entering the passage 218 is forced, via a bore 222 in fan housing section 140a, into one end of a transfer conduit 224 which communicates at its opposite end with a small transfer passage 226. Transfer passage 226 communicates with an annular passage 228 which, in turn, communicates with the journal bearing clearance space 212. Bleed air entering transfer passage 228 is sequentially forced into the annular passage 228, through the clearance space 212, across the labyrinth seal 214 and into the interior of the fan housing section 140b. All of the lubricating bleed air entering the fan housing is forced outwardly through its outlet 144 by the rotation of fan 56.

It can be seen that the present invention's utilization of compressor bleed air to both drive the air cycle machine and continuously lubricate its bearing system eliminates the conventional necessity of using a separate, oil-based lubrication system which must be isolated or otherwise protected from the heated ram air 96 traversing the fan housing. Additionally, the gas foil bearings 174, 176, 178 themselves are unaffected by their proximity to this high temperature air and permit substantially higher rotational speeds than do conventional oil-lubricated bearings.

In summary, in accordance with the foregoing description, a substantially improved air cycle cooling machine system is provided in which the machine's fan is positioned between the turbine and compressor and between the two series-mounted heat exchangers. By providing two parallel bleed air flow paths within the cooling machine—one across the turbine wheel and the other through the bearing system and into the fan housing—a particularly advantageous dual use of such bleed air is achieved. Because of these features, both the cooling machine and the system which incorporates it are rendered more reliable, compact, rugged and efficient.

The foregoing detailed description is to be clearly understood as given by way of illustration and example only, the spirit and scope of this invention being limited solely by the appended claims.

What is claimed is:

1. Apparatus for providing environmental control cooling air to a conditioned space such as an aircraft cabin or the like, said apparatus comprising:
   (a) an air cycle cooling machine comprising:
      (1) turbine means,
      (2) compressor means spaced from said turbine means,
      (3) fan means positioned between said turbine means and said compressor means, and
      (4) shaft means drivingly interconnecting said turbine means, said compressor means and said fan means;
   (b) a first heat exchanger having first and second thermally communicating flow paths extending therethrough;
   (c) a second heat exchanger having first and second thermally communicating flow paths extending therethrough;
   (d) duct means for flowing ambient air sequentially through said first flow path of said first heat exchanger, said fan means, and said first flow path of said second heat exchanger in response to operation of said fan means;
   (e) duct means for flowing pressurized air from a source thereof sequentially through said second flow path of said second heat exchanger, said compressor means, said second flow path of said first heat exchanger, and said turbine means to thereby simultaneously operate said turbine means, said fan means and said compressor means, the pressurized air exiting said turbine means being suitable for use as environmental control cooling air.

2. The apparatus of claim 1 further comprising moisture removal means operatively positioned in said duct means (e) between said first heat exchanger and said turbine means.

3. The apparatus of claim 2 wherein said moisture removal means and said cooling machine are positioned between said first and second heat exchangers.

4. The apparatus of claim 1 wherein said air cycle cooling machine further comprises air lubricated bearing means for supporting said shaft means, and said apparatus further comprises means for flowing pressurized air from said source thereof through said bearing means to lubricate the same.

5. The apparatus of claim 4 wherein said bearing means include gas foil bearings.

6. The apparatus of claim 4 wherein said bearing means include a gas foil thrust bearing and at least one gas foil journal bearing.

7. The apparatus of claim 4 wherein said turbine means means include a turbine housing for receiving pressurized air from said source thereof, said fan means include a fan housing, and said means for flowing pressurized air from said source thereof through said bearing means include means defining a flow path from the interior of said turbine housing, through said bearing means and into said fan housing.

8. A method of utilizing bleed air from an aircraft propulsion engine to cool the cabin of the aircraft, said method comprising the steps of:
   (a) providing first and second heat exchangers;
   (b) providing an air cycle cooling machine having operably connected to shaft means, in axial succession therealong, a turbine, a fan and a compressor;
   (c) flowing ambient air sequentially through said first heat exchanger, said fan and said second heat exchanger; and
   (d) flowing bleed air sequentially through said second heat exchanger, said compressor, said first heat exchanger, said turbine and into the cabin.

9. The method of claim 8 further comprising the step of utilizing a portion of the bleed air to support said shaft means.

10. The method of claim 9 wherein said last-mentioned step is performed by mounting gas foil bearing means on said shaft means and flowing bleed air from within said turbine through said gas foil bearing means into said fan.

* * * * *